Sept. 29, 1936.   D. B. HOWARD ET AL   2,055,495
FLIGHT ATTITUDE AND MOVEMENT INDICATOR
Filed July 18, 1930   4 Sheets-Sheet 1
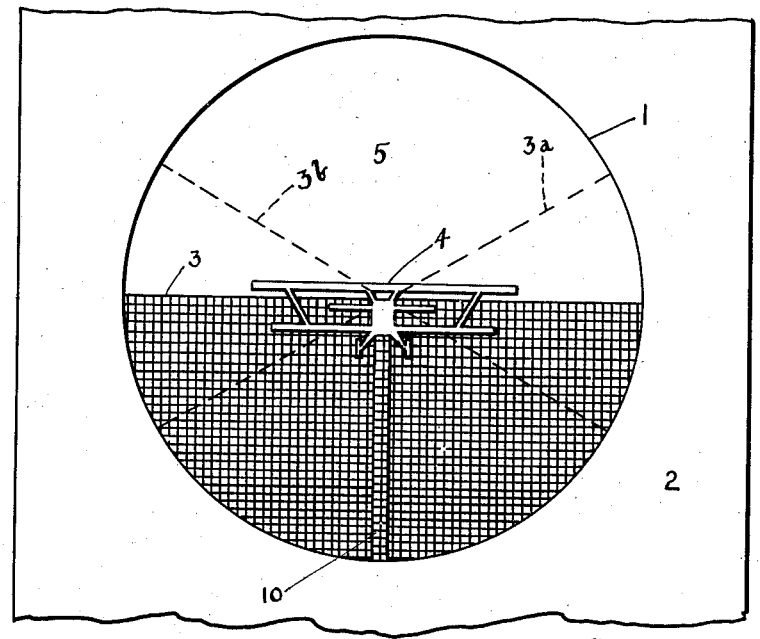
FIG. II
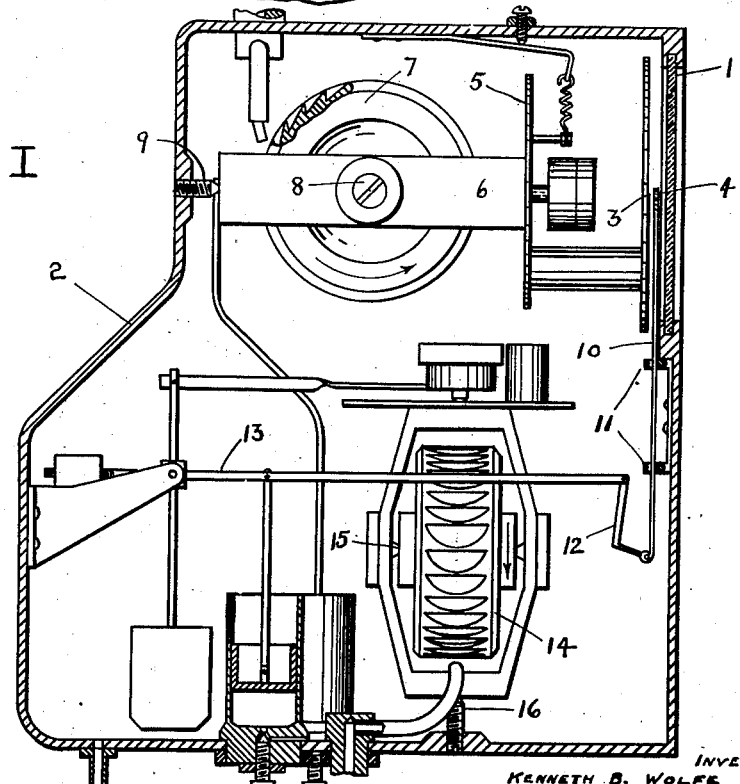
FIG. I
INVENTORS:
KENNETH B. WOLFE
DUDLEY B. HOWARD
BY Robert H. Young
ATTORNEY.

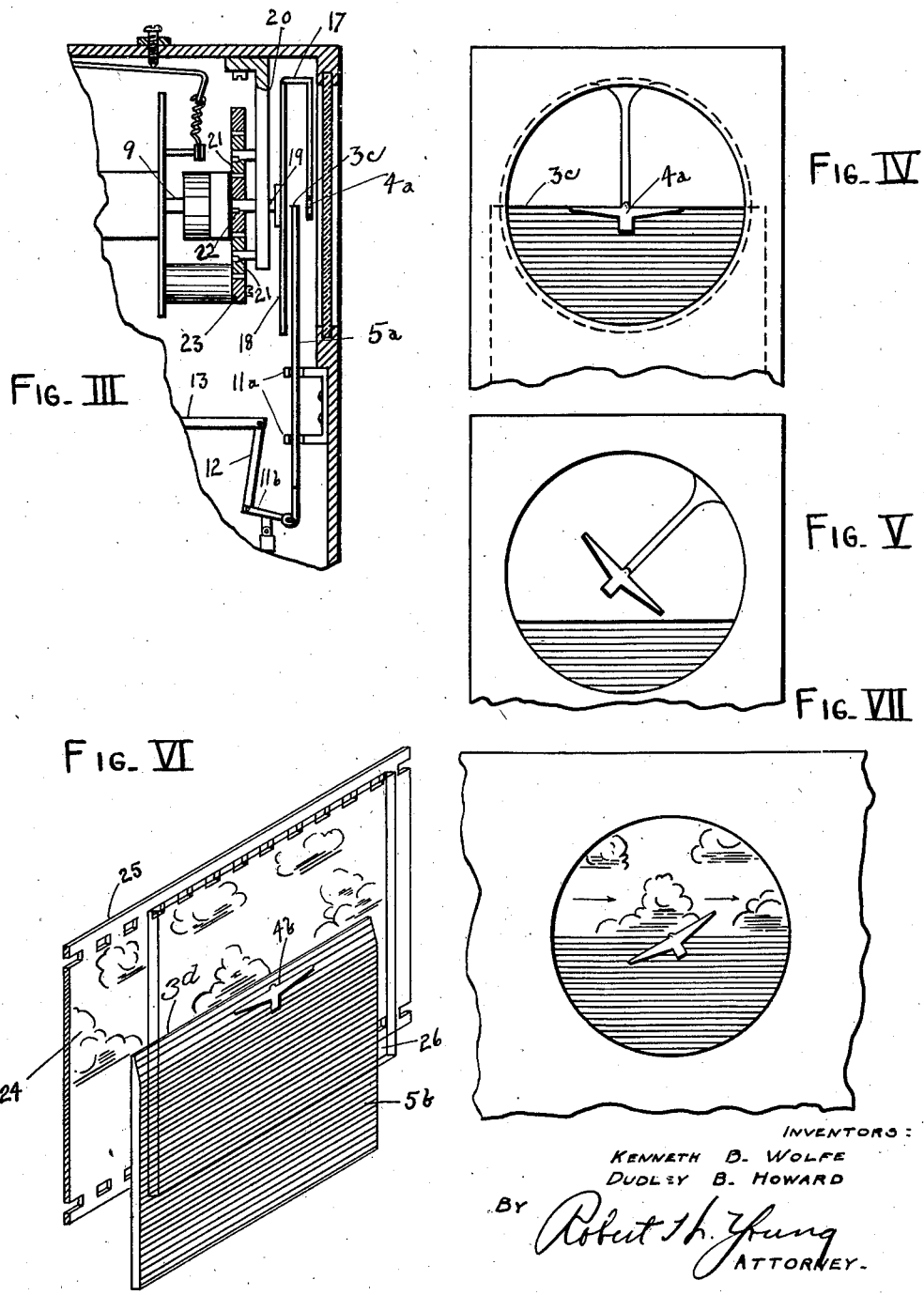

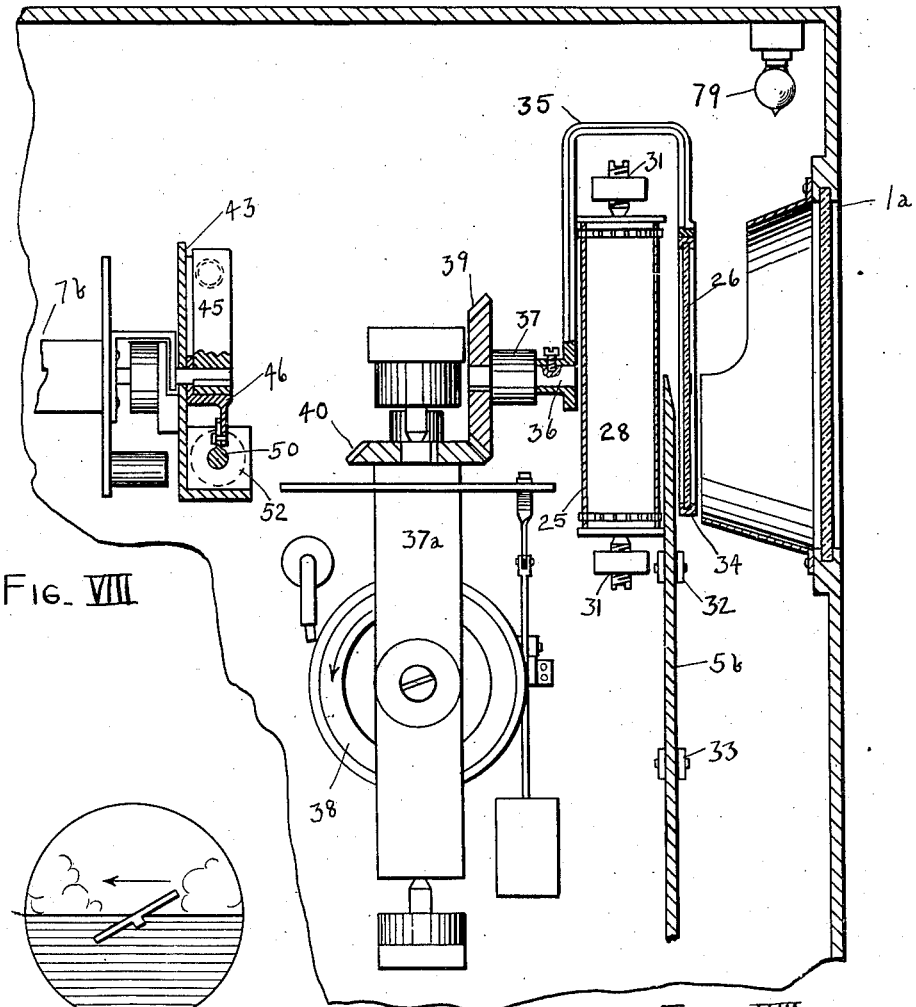
FIG. VIII
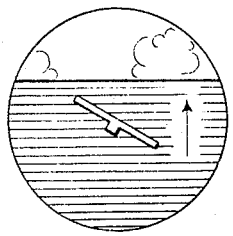
FIG. X
FIG. XI
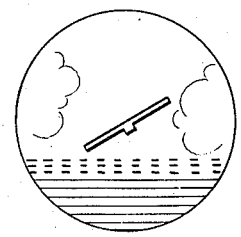
FIG. XII
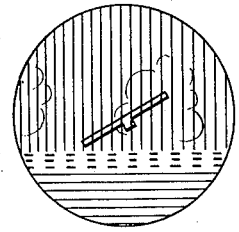
FIG. XIII
INVENTORS:
KENNETH B. WOLFE
DUDLEY B. HOWARD

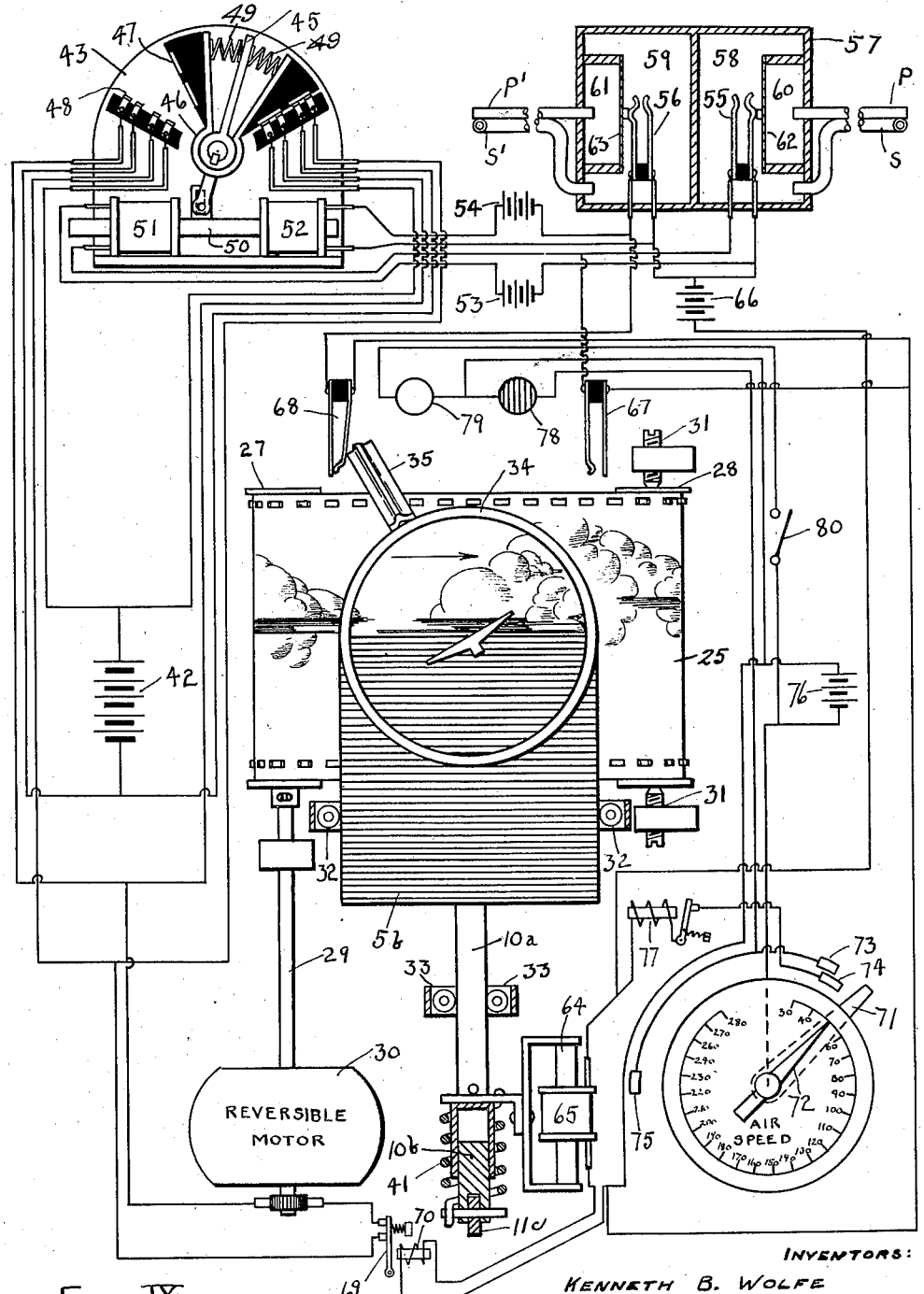

Patented Sept. 29, 1936

2,055,495

UNITED STATES PATENT OFFICE 2,055,495

FLIGHT ATTITUDE AND MOVEMENT INDICATOR

Dudley B. Howard, Riverside, Calif., and Kenneth B. Wolfe, Dayton, Ohio

Application July 18, 1930, Serial No. 468,964

13 Claims. (Cl. 33—204)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to flight indicators for use in airplanes and in particular to such instruments of the artificial horizon type designed for use in "blind" flying in fog or clouds when the actual horizon is invisible.

The primary object in view is to provide a flight indicator which, in operation, will present to the pilot a natural picture of the attitude of his aircraft that changes during flight to reproduce faithfully the successive changes of attitude.

A further object is to provide a flight indicator of this type which, in addition to indicating attitude, will indicate the nature of movement of the aircraft about its three major axes, such as properly banked turning movement, slipping, skidding, stalling, and excessive speed.

Other advantages of the invention should become apparent as the following specific description is read in connection with the accompanying drawings, in which—

Figure I is a vertical section of a simplified form of the instrument, showing means for indicating attitude alone;

Figure II is a fragmentary elevation of the face of the instrument illustrated in Figure I showing the horizon and aircraft representations in a relationship denoting straight and level flight;

Figure III is a fragmentary vertical section of a modified form of the device wherein the arrangement of primary indicating elements is reversed to cause pivoting movement of the aircraft representation instead of the artificial horizon;

Figure IV is a fragmentary elevation of the face of the instrument depicted in Figure III, showing indication of straight and level flight;

Figure V is a similar view showing indication of a climbing right turn;

Figure VI is a diagrammatic perspective view of the three primary indicating elements of the preferred form of the device in positions indicating straight and level flight;

Figure VII is a fragmentary elevation of the face of the preferred form of instrument, showing indication of a properly banked left turn without gain or loss of altitude;

Figure VIII is a fragmentary vertical section of the preferred form of instrument, showing its primary elements in positions indicating straight and level flight;

Figure IX is a diagrammatic assembly view, showing the primary indicating and control elements, including those located outside the instrument case, and the complete system of electrical circuits;

Figure X is a diagrammatic view of the instrument dial, showing indication of a skidded left turn with nose on the horizon;

Figure XI is a similar view showing slipping on a right turn;

Figure XII is a similar view, showing an incipient stall when making too steep a climbing left turn;

Figure XIII is a similar view showing red illumination of the dial to denote an advanced stage of stalling, such as immediately precedes falling into a spin.

In Figures I and II, a simplified form of instrument is illustrated. In this device, attitude in flight is indicated by gyrostats through the relative adjusting of two primary indicating elements, which are visible through a view opening 1 in the face of the instrument case 2. These elements are the artificial horizon representation 3 and the miniature aircraft representation 4.

The artificial horizon may be produced conveniently by painting the lower half of a circular disk 5 black, blue, or any color which will be distinguishable in appearance from the upper half, which is preferably white. The line of demarkation between the dark and light semicircles constitutes the artificial horizon.

Disk 5 should be mounted so as to be axially pivoted. A convenient arrangement is to connect it for rotation with the gimbal frame 6 of a turn-responsive gyrostat 7 of the restrained type ordinarily used in flight indicators. This "gyro", therefore, is disposed with its spin axis 8 normally parallel to the lateral axis of the aircraft in which the instrument is used. The gimbal 9 should be parallel to the longitudinal aircraft axis. The gyro is adapted to be driven by air blast in the direction of the arrow in the usual manner. Further details of construction of the gyro will not be described, because no invention in the same is claimed.

The aircraft representation 4 is shown mounted on a stem 10, which is radially movable with respect to the axis of disk 5 in bearings 11. The lower end of the stem 10 may be connected, as shown, by link 12 with the lever arm 13 of the usual pitch-responsive gyro 14. This gyro is of the usual non-pendulous type as shown in Patent No. 1,812,503, June 30, 1931 and does not require detailed description. It will be noted that its spin axis 15 is normally parallel to the longitudinal aircraft axis and its gimbal axis 16 parallel to the vertical aircraft axis. The stem 10 should be of such length that the aircraft representation 4 will be on a level with the center of the artificial horizon 3 when the actual supporting aircraft is in level position fore-and-aft. In the operation of the instrument just described, the turn-responsive gyro 7 maintains the artificial horizon parallel to the lateral aircraft axis when the aircraft is flying straight. When a turn to the right is made, the resulting precession of the gyro will cause the disk 5 to oscillate in counter-clockwise direction to bring the artificial horizon into the dotted line position 3a. This action produces an angular arrangement of the miniature aircraft representation with respect to the artificial horizon which gives the usual appearance of the banked attitude of an aircraft when viewed in connection with the actual horizon and ground plane. A turn to the left will cause reverse oscillation of the disk in clockwise direction into a position wherein the artificial horizon will assume the position of dotted line 3b.

Pitching of the aircraft will cause the miniature aircraft 4 to move above or below the artificial horizon to correspond with climbing and gliding movements of the actual aircraft, respectively, through the action of the gyro 14.

In Figures III to V, inclusive, the connection of the artificial horizon and miniature aircraft representations with the two gyros reversed, the former being connected with the pitch-responsive gyro and the latter with the turn-responsive gyro, in this instance. The artificial horizon representation 3c is preferably formed by the upper edge of a rectangular plate 5a mounted for vertical reciprocation in bearings 11a and connected by rocker member 11b and link 12 to lever arm 13 of the pitch-responsive gyro (not shown). On the level fore-and-aft attitude of the actual aircraft, the artificial horizon will be maintained on a level with the gimbal axis 9 of the turn-responsive gyro.

The aircraft representation 4a is disposed in alignment with the gimbal axis 9 of the turn-responsive gyro at all times. It is supported by arched stem 17 projecting from disk 18 attached to pivot shaft 19 mounted in a bearing in bracket 20. Disk 18 is concentric with the gimbal axis of the gyro so as to cause oscillation of the aircraft representation about that axis. Intermediate gears 21 connect gear 22 keyed to shaft 19 with an annular geared rack 23 attached fixedly to the gimbal frame concentric with its rotational axis. The gearing will cause reversal in direction of oscillation of the aircraft representation with respect to the gyro gimbal frame.

In operation, simulated banking of the miniature aircraft in the same direction as the actual aircraft banks in a turn will be produced. For instance, in a turn to the right, the gimbal frame of the turn-responsive gyro will oscillate in counter-clockwise direction. Resulting oscillation of the miniature aircraft will be clockwise as indicated in Figure V. In this figure a climbing turn is indicated. Elevation of the nose of the aircraft in climbing causes the pitch-responsive gyro to precess in a direction which results in downward thrust of the stem 5a, which is opposite to the direction of movement of the adjacent end of lever arm 13. This action lowers the artificial horizon beneath the miniature aircraft and produces the visual effect of climbing above the horizon.

In the remaining figures of drawings, a preferred form of the device is disclosed. This modification is designed with a view to affording indication of more than the general attitude of the aircraft in flight. Improperly executed turns will be indicated; also slipping without turning and stalling.

The primary indicating elements employed in the improved device are three in number, instead of merely two as in the simplified form. In addition to an artificial horizon representation, and a miniature aircraft representation, there is a representation of sky scenery such as appears above the horizon in flight. All three representations are preferably independently movable and disposed in appropriate positions adjacent to each other. A convenient arrangement is illustrated diagrammatically in Figure VI.

In the figure just mentioned, the sky scenery representation 24 is depicted on a band 25 of opaque material. The artificial horizon 3d is represented by the upper edge of an opaque plate 5b, which masks a portion of the sky scenery reseentation. The miniature aircraft representation 4b is depicted on a transparent plate 26 disposed in super-imposed relation to the plate 5b and band 25. Plates 26 and 5b should be in substantial parallelism with the exposed portion of band 25.

Various alternative arrangements and movable relationships of the three primary indicating elements may be chosen in practice, but a simple, convenient embodiment of the inventive idea is disclosed in Figures VIII and IX in particular. In accordance therewith, the band 25 is endless in form and mounted on spools 27 and 28, which are disposed so that the stretch of band nearest the view opening 1a will always be parallel thereto. Spool 27 is adapted to be secured fixedly to a driving shaft 29 extending vertically from a reversible electric motor 30, which has been chosen as the prime mover for the band 25. Spool 28 idles in bearings 31.

The sky scenery has been represented by banks of clouds extending throughout the length of the band 25 and located principally in the upper half of the same. The scenery may be of any nature which will permit ready discernment of any translatory movement along the artificial horizon.

Plate 5b, the upper edge of which represents the artificial horizon, is mounted for vertical reciprocation in suitable bearings 32 between the band 25 and the view opening. Its operating stem 10a is also mounted in bearings 33, which assist bearings 32 in assuring smooth true movement of the plate. The apparent face plate 5b should be entirely plain in appearance and darker in shade than the background of the sky scenery in order to present the appearance of ground without disclosing any definite ground objects. The result in view is the optical illusion of simultaneous horizontal translation of both the sky scenery and the ground representation.

The miniature aircraft is represented on transparent plate 26 by etching, painting, or in any other convenient manner. The plate is shown mounted in a rim 34 supported by arched stem 35 in a position between the plate 5b and the view opening. Stem 35 is attached to a rock shaft 36 pivoted in bearing 37 concentric to the view opening. The aircraft representation 4b should be in alignment with the pivotal axis of shaft 36 so that it may oscillate about the axis.

The ultimate object of the above described arrangement of the three primary indicating elements is the optical illusion of horizontal translation of the miniature aircraft along the artificial direction to actual translation of the sky scenery.

Rock shaft 36 of the shifting means for the aircraft representation is connected with the gimbal frame 37a of a bank-responsive gyro 38 by bevel gears 39 and 40. This gyro is similar in type to the pitch-responsive gyro in that it is non-pendulous. It is disposed with its gimbal axis vertical and its spin axis normally parallel to the lateral axis of the actual supporting aircraft. Banking of the aircraft in a given direction results in banking of the miniature aircraft representation in the same direction. For instance, banking in counter-clockwise direction as in a left turn produces the corresponding simulated banking of the miniature aircraft illustrated in Figure IX.

Plate 5b, which affords the artificial horizon, has its operating stem connected indirectly with a lever arm corresponding to lever 13 (Fig. 3) of the pitch-responsive gyro. It is desired that there shall be a slight degree of play between the plate and lever arm to permit vibration of the plate in its bearings, by means which will be described presently, to indicate stalling. For this purpose, the stem is divided into telescopic sections 10a and 10b which are connected yieldably by a spring 41. Stem section 10b is pivotally connected to the rocker member 11c which corresponds to the member 11b of Figure III. The remainder of the connecting mechanism which is interposed between the stem of plate 5b and the pitch-responsive gyro is identically the same as shown in Figure III so is omitted from the disclosure in Figures VIII and IX.

The motor 30 which rotates the driving spool 27 of the sky scenery shifting mechanism is adapted to be connected electrically with a source of current 42 by a reversing switch 43 having a movable contact member 45 that is maintained normally in neutral position, wherein all motor circuits are open, by usual turn-responsive gyro whose gimbal ring is shown at 7b with which it is directly connected, as shown particularly in Figure VIII. The construction and wiring arrangement is such that a turn to the left in flight will throw the movable contact member clockwise and cause rotation of the motor in a direction which will translate the sky scenery representation in a direction outward from the turn indicated in Figure IX. The arrow indicates the direction of translation of scenery. Turning to the right will cause the movable switch member 45 to be thrown by the turn-responsive gyro 7b in the reverse direction and will reverse the motor circuit to produce appropriate translation of scenery outward from the turn in the new direction. The switch will be restored to normal open position by return to straight flight.

In order to indicate skidding on a turn, means are provided for throwing the reversing switch back into a direction opposite to that caused by action of the turn-responsive gyro in a turn whenever skidding occurs due to improper manipulation of the aircraft controls. For this purpose the movable switch member may be divided, as shown, into two principal parts, the movable contact member 45 and a movable holder 46 for the contact plates 47 which are adapted to bridge the stationary contact points 48. Yieldable springs 49 are interposed between the arm 45 and branches of the holder 46 and provide a yieldable connection therebetween. The common core 50 is connected operatively with the holder 46. The solenoid coils 51 and 52 are connected in normally open electric circuits with two separate sources of current 53 and 54, respectively. The direction of winding and polarity of the circuits are such that energization of solenoid 51 will cause the reversing switch member 46 to be thrown in counter-clockwise direction (Figure IX), whereas energization of solenoid 52 will produce clockwise movement of the switch member 46. Normally open switches 55 and 56 are adapted to close the respective circuits in which solenoid coils 51 and 52, are connected to energize the same.

Various agencies may be selected for automatic closing of the switches 55 and 56 in response to skidding. A convenient device for this purpose may be constructed upon the principle of the Pitot-static airspeed indicator. Such a device is shown in the upper right hand corner of Figure IX. Control box 57 is mounted in some position convenient to the flight indicator and contains the switches 55 and 56. The box is divided into two air-tight compartments 58 and 59. A static tube S extends from compartment 58 laterally toward the right wing tip of the aircraft and another static tube S' extends laterally from the other compartment toward the opposite wing tip. Pitot tubes P and P' extend from diaphragm boxes 60 and 61 toward the right and left wing tips respectively. Diaphragms 62 and 63, which are moved inward by differences in pressure in the corresponding tubes are adapted to close the switches 55 and 56, respectively. Skidding toward the right will, therefore, close switch 55 and skidding toward the left will close switch 56.

Figure X shows the indication of skidding on a left turn. Although the miniature aircraft is banked toward the left it appears to be skidding outward from the turn, due to translation of sky scenery toward the left. This reverse movement of the sky scenery results from the predominating effect upon the gyro influenced reversing switch by the appropriate skid-operated switch.

In order to indicate slipping which is in the direction of the lowered wing in a turn or other banked movement, the core 64 of a solenoid 65 is connected to the stem 10a of the artificial horizon-representing plate 5b for rectilinear movement therewith. The solenoid coil is connected electrically with a source of current 66 by two normally open parallel circuits. One circuit includes switch 55 of control box 57 and a supplementary switch 67, which is adapted to be closed by the arched stem 35 of the miniature aircraft representation rim whenever the actual aircraft is banked to the right. The solenoid coil 65 is connected by the other branch of the circuit with the source 66 through switch 56 and supplementary switch 68, adapted to be closed by stem 35, when the aircraft is banked to the left, as indicated in Figure IX. Coil 65 is wound so that energization of the same will thrust the stem 10a upward to move the artificial horizon above the miniature aircraft. The impression afforded will be that of slipping.

Referring to Figure IX, it will be noted that switch 68 is closed in the left turn simulated. While the turn is properly executed, the sky scenery will move along the artificial horizon in a direction outward from the turn. Should the aircraft commence to slip inward on the turn, switch 56 will be closed automatically by the Pitot-static control mechanism. Energization of solenoid 65 will result and the artificial horizon will be elevated in the manner previously described. At the same instant, the circuit of the reversible motor 30 will be broken by an automatic switch 69, through energization of its electromagnet 70, the coil of which is connected in the circuit of solenoid 65. A spring normally maintains the automatic switch 69 closed. Stoppage of motor 30 causes the sky scenery of the indicating elements to become stationary. The visual effect is illustrated in Figure XI.

It seems desirable to indicate stalling by vibration of the artificial horizon to simulate wavering and instability of the aircraft. In order to allow for reaction time in averting a spin, means have been provided for giving a preliminary indication of serious loss of flying speed and a final indication distinguishable from the first at the advanced stage of stalling when the aircraft is on the verge of spinning. The final stage is signalled by the illumination of the indicating elements with a red light.

With these purposes in view, an airspeed indicator of usual type, which may be the one included in the regular equipment of the aircraft instrument board, is utilized as the stall-responsive agency for producing the indicating signals just mentioned. A circuit-closer is attached to the air speed indicator in any convenient manner so that movement of the indicating pointer to any predetermined critical air speed will cause an appropriate circuit to be closed. In the present instance, a movable contact arm 71 is movable in unison with the indicating pointer 72 and is adaped to traverse three stationary contact points 73, 74, and 75. Contact point 73 should be located adjacent to the air speed indicator on the instrument scale which represents actual stalling speed of the particular aircraft on which the instrument is to be used. Contact point 74 is located adjacent to a predetermined reading which approaches stalling speed by an interval sufficient for reaction time. Contact point 75 is disposed adjacent to a reading which represents an air speed nearly as high as maximum safe speed for the particular aircraft. The movable contact arm 71 is connected electrically with one pole of a source of current 76. Contact point 74 is connected with the opposite pole of source 76 through solenoid coils 65 and an interrupter 77. Contact points 73 and 75 are connected with the same pole of source 76 as that to which contact point 74 is connected and includes a red light bulb 78 in this branch of the circuit. The light bulb should be located in a suitable position to cast its colored light on the indicating elements 4b, 5b and 24 whenever the circuit is closed. A second bulb 79 adapted to produce white light is shown disposed in a similar position and connected in parallel with source 76 through a manual switch 80, by which its circuit may be closed at will to illuminate the indicating elements for observation in the dark.

The operation of the indicator when flying speed is lost to a serious degree is as follows: Movable contact 71 first touches stationary contact 74. The solenoid coil 65 is connected with source 76 and becomes energized intermittently due to the operation of interruption 77, which rapidly makes and breaks the circuit. Vibration of the artificial horizon results, giving the visual effect shown in Figure XII. This is a preliminary danger signal. Simultaneously with the vibration of the artificial horizon, the movement of the sky scenery is interrupted due to the operation of the interrupter mechanism 69—70. Further loss of flying speed will cause the movable contact to reach stationary contact 73. In addition to vibration, the sky scenery, etc. will reflect a red glare of light which should attract the pilot's attention if he has missed the preliminary indication. Overlapping of the stationary contacts 73 and 74 in the manner shown will cause vibration of the artificial horizon to continue during display of the red danger light. This will distinguish from mere display of the red light which occurs when movable contact 71 touches stationary contact 75 at critically high speed.

We claim—

1. A flight indicator comprising means for representing an artificial horizon, means for representing a miniature aircraft adjacent to the artificial horizon, means for representing sky scenery in appropriate relationship to the artificial horizon, means mounting the artificial horizon and miniature aircraft representations for relative angular movement and for rectilinear movement above and below each other, means responsive to banking and pitching movements in flight adapted to cause relative movement of the miniature aircraft and artificial horizon representations simulating the changes in attitude of the actual supporting aircraft, means mounting the sky scenery representation for translatory movement along the artificial horizon representation in opposite directions, means responsive to turning movement in flight adapted to produce appropriate translatory movement of the sky scenery along the artificial horizon outward from the indicated direction of turn, and means responsive to skidding movement outward on a turn adapted to reverse the direction of translation of the sky scenery.

2. A flight indicator comprising means for representing an artificial horizon, means for representing a miniature aircraft adjacent to the artificial horizon, means mounting the artificial horizon and miniature aircraft representations for relative angular movement and for rectilinear movement above and below each other, means responsive to banking and pitching movements in flight and adapted to cause relative movement of the miniature aircraft and artificial horizon representations simulating the attitude of the actual supporting aircraft, and means responsive to side slipping movement and adapted to cause relative vertical movement of the two representations simulating the slip.

3. A flight indicator comprising means for representing an artificial horizon, means for representing a miniature aircraft adjacent to the artificial horizon, means for representing sky scenery in appropriate relationship to the artificial horizon, means mounting the artificial horizon and miniature aircraft representations for relative angular movement and for rectilinear movement above and below each other, means responsive to banking and pitching movements in flight and adapted to cause relative movement of the miniature aircraft and artificial horizon representations simulating the changes in attitude of the actual supporting aircraft, means mounting the sky scenery representations for translatory movement along the artificial horizon representations in opposite directions, means responsive to turning movement in flight and adapted to produce appropriate translatory movement of the sky scenery along the artificial horizon outward from the indicated direction of turn, and means responsive to side slipping movement and adapted to cause relative vertical movement of the aircraft and artificial horizon representations simulating the slips.

4. A flight indicator comprising means for representing an artificial horizon, means for representing a miniature aircraft adjacent to the artificial horizon, means mounting the artificial horizon and miniature aircraft representations for relative angular movement and for rectilinear movement above and below each other, and means responsive to reduction of airspeed of flight to a point bearing a predetermined relationship to stalling speed and adapted to produce distinctive relative movement of the miniature aircraft and artificial horizon representations.

5. A flight indicator comprising means for representing an artificial horizon, means for representing a miniature aircraft adjacent to the artificial horizon, means mounting the artificial horizon and miniature aircraft representations for relative angular movement and for rectilinear movement above and below each other, and means responsive to reduction of airspeed of flight to a point bearing a predetermined relationship to stalling speed and adapted to produce vibrating relative movement of the miniature aircraft and artificial horizon representations to simulate wavering.

6. A flight indicator comprising means for representing an artificial horizon, means for representing a miniature aircraft adjacent to the artificial horizon, means mounting the artificial horizon and the miniature aircraft representations for relative angular movement and for rectilinear movement above and below each other, means responsive to banking and pitching movements in flight and adapted to cause relative movement of the miniature aircraft and artificial horizon representations simulating the attitude of the actual supporting aircraft, and means responsive to reduction of airspeed of flight to a point bearing a predetermined relationship to stalling speed and adapted to produce distinctive relative movement of the two representations.

7. A flight indicator comprising means for representing an artificial horizon, means for representing a miniature aircraft adjacent to the artificial horizon, means mounting the artificial horizon and miniature aircraft representations for relative angular movement and for rectilinear movement above and below each other, means responsive to banking and pitching movements in flight and adapted to produce relative movement between the two representations simulating the successive changes in attitude of the actual supporting aircraft, means for representing sky scenery in appropriate relationship to the artificial horizon, means mounting the sky scenery representations for translatory movement along the artificial horizon representation in opposite directions, means responsive to turning movement in flight and adapted to cause translatory movement of the sky scenery along the artificial horizon in a direction outward from the turn, means responsive to slipping inward on a turn adapted to cause relative vertical movement of miniature aircraft and artificial horizon simulating loss of altitude, and means responsive to side slipping inward on a turn and adapted to interrupt movement of the sky scenery translating means.

8. A flight indicator comprising means for representing an artificial horizon, means for representing a miniature aircraft adjacent to the artificial horizon, means mounting the artificial horizon and miniature aircraft representations for relative angular movement and for rectilinear movement above and below each other, means responsive to banking and pitching movements in flight and adapted to produce relative movement between the two representations simulating the successive changes in attitude of the actual supporting aircraft, means for representing sky scenery in appropriate relationship to the artificial horizon, means mounting the sky scenery representations for translatory movement along the artificial horizon representation in opposite directions, means responsive to turning movement in flight adapted to cause translatory movement of the sky scenery along the artificial horizon in a direction outward from the turn, means responsive to critical loss of flying speed and adapted to cause relative vertical movement of miniature aircraft and artificial horizon simulating wavering in flight, and means responsive to critical loss of air-speed and adapted to interrupt movement of the sky scenery translating means during indication of wavering.

9. In combination, a turn indicator surface having a sky view thereon, gyroscopically controlled means for bodily moving said surface from left to right and vice versa upon turning of an aircraft to which the turn indicator surface is attached, and a movable bank indicator including a movable bank indicating element cooperatively and adjacently positioned in the same field of view as said turn indicator surface for visual correlation therewith.

10. In an aerial flight instrument the combination of a screen having depicted thereon the normal flight view in clear weather of the pilot of an aircraft, gyroscopic means for laterally moving the screen to indicate the direction of turn of the aircraft to which the instrument is attached, a wing-like inclinometer operatively mounted in the same field of view as the screen and in co-relation therewith, and a rise and fall indicating element supported for movement in the same field of view as the inclinometer and screen and movable in a line transverse to the screen movement.

11. In a turn indicating instrument the combination of a supporting frame, relatively spaced roller means on the frame operating on vertical axes, a screen rotatable over said roller means and extending therebetween so that the same may be wound between the roller means from left to right and vice versa, said screen on its forward surface having a view similar to the pilot's view of the sky during a flight, and including a horizon, and gyroscopic means for operating the roller means to move the screen from left to right and vice versa in co-related indication with the turn of the aircraft to which the instrument is attached.

12. In an aerial flight instrument the combination of a supporting frame, an indicator in the form of the wing of an aircraft pivoted upon an axis lying between its ends mounted upon said supporting frame to assume tipped relation thereto, a gyroscope having a precessing frame mounted for response to banked turns of the aircraft, and means gearing the precessing frame with the wing-like indicator so that the indicator will tip in the field of view of the pilot in the same tipping direction as the aircraft to which the instrument is attached and in such manner as to displace the indicator to substantially the same degree as the bank angle of the aircraft upon which the instrument is used.

13. A flight indicator for aircraft comprising, means for representing a miniature aircraft, means for representing pictorially an artificial horizon positioned behind said aircraft, means for mounting said representation means for relative angular and translatory movements respectively, one of said mounting means being responsive to banking movement in flight and the other of said mounting means being responsive to pitching movement in flight whereby said representation means will indicate the relative attitude and path of movement of the supporting aircraft in flight, and means responsive to slipping movement in flight for producing relative movement of both said representation means simulating corresponding movements of the supporting aircraft in flight during said slip.

DUDLEY B. HOWARD.
KENNETH B. WOLFE.